United States Patent [19]

Lindemann

[11] 3,941,735
[45] Mar. 2, 1976

[54] AQUEOUS EMULSION ADHESIVE OF A COPOLYMER OF AN ALCOHOL ETHER OF N-METHYLOL DERIVATIVE OF AN ALLYL CARBAMATE WHICH DEVELOPS WATER RESISTANCE THROUGH CURE

[75] Inventor: Martin K. Lindemann, Greenville, S.C.

[73] Assignee: Chas. S. Tanner Co., Greenville, S.C.

[22] Filed: Sept. 26, 1973

[21] Appl. No.: 401,088

[52] U.S. Cl. 260/29.6 WB; 260/17 A; 260/29.6 RW; 260/29.6 WA; 260/29.6 H; 260/29.6 TA
[51] Int. Cl.². C08L 33/24; C08L 29/04; C08L 1/26
[58] Field of Search... 260/29.6 TA, 29.6 H, 29.6 B, 260/29.6 PW, 29.6 WA, 29.6 WB, 17 R, 17 A

[56] References Cited
UNITED STATES PATENTS

| | | | |
|---|---|---|---|
| 2,984,588 | 5/1961 | Gravlich et al. | 260/29.6 TA |
| 3,189,581 | 6/1965 | Hart et al. | 260/29.6 TA |
| 3,247,139 | 4/1966 | Christenson et al. | 260/29.6 TA |
| 3,288,740 | 11/1966 | Maeder et al. | 260/29.6 TA |
| 3,368,999 | 2/1968 | Sekmakas et al. | 260/29.6 TA |
| 3,692,726 | 9/1972 | Ochmichen | 260/29.6 TA |
| 3,708,388 | 1/1973 | Lindemann et al. | 269/29.6 TA |
| 3,852,233 | 12/1974 | Lindemann | 260/29.6 TA |

OTHER PUBLICATIONS
Davidson et al. – Water–Soluble Resins, second Edition, 1962, p. 118.

*Primary Examiner*—Harold D. Anderson
*Attorney, Agent, or Firm*—Dressler, Goldsmith, Clement & Gordon, Ltd.

[57] ABSTRACT

Vinyl esters, such as vinyl acetate, are copolymerized, especially with ethylene or maleate or fumarate diester to provide adhesives which develop water resistance through cure by including in the copolymer at least 0.5% of an N-methylol functional derivative of an allyl carbamate etherified with a $C_1$ - $C_8$ alcohol. The monomers are stabilized during the copolymerization by an hydroxy functional protective colloid.

16 Claims, No Drawings

3,941,735

AQUEOUS EMULSION ADHESIVE OF A COPOLYMER OF AN ALCOHOL ETHER OF N-METHYLOL DERIVATIVE OF AN ALLYL CARBAMATE WHICH DEVELOPS WATER RESISTANCE THROUGH CURE

The present invention relates to vinyl ester aqueous emulsion adhesives which develop water resistance through cure, especially using copolymers of vinyl acetate with ethylene.

In the aqueous emulsion adhesives under consideration, the adhesive characteristic is supplied by the combination of an emulsion copolymer stabilized in the emulsion by an hydroxy functional protective colloid, especially polyvinyl alcohol or hydroxy ethyl cellulose, as the essential agents stabilizing the emulsion. Specifically, anionic and nonionic surfactants should not be present as the primary emulsifier, though small amounts of such agents for ancillary purpose, such as reducing surface tension, may be used.

Adhesives of the type under consideration are known, as illustrated for example in U.S. Pat. No. 3,708,388, in which I am a coinventor. However, these prior adhesives lack water resistance, and this limits the utility of the adhesive.

In U.S. Pat. No. 3,708,388 it was found that when monomers providing thermosetting capacity were present, instead of protective colloids, such as polyvinyl alcohol or hydroxy ethyl cellulose, that the adhesive quality was impaired. Further, if monomers providing thermosetting capacity, and especially N-methylol acrylamide, are present during the emulsion copolymerization together with the hydroxy functional protective colloid, then it is found that the curing reaction between the N-methylol group and the hydroxy group takes place during the polymerization. This produces excessive emulsion viscosities and, at times, produces a cheesy or gel-like emulsion which is useless.

The tendency for excessive emulsion viscosity or gelation can be combatted by reducing the resin solids content of the emulsion, but this is disadvantageous because compounding is more difficult, and the adhesive dries more slowly. Also, one has not prevented the premature reaction between the N-methylol group and the hydroxy group, but merely rendered such premature reaction more tolerable. As a result, the ultimate curing potential is sacrificed. Moreover, the maximum proportion of N-methylol functionality which can be accepted in the copolymer is also reduced.

It is noted in passing that the reaction between the N-methylol group and the hydroxy group is extremely rapid, and the aqueous emulsion environment easily allows the water of reaction to dissipate into the aqueous phase of the latex, so there is no control over water removal as is possible when proceeding in water immiscible solvent solution to minimize premature reaction.

In accordance with this invention, vinyl ester, especially vinyl acetate, is polymerized in aqueous emulsion in the presence of hydroxy-functional protective colloid as the essential emulsifying agent, and an N-methylol-functional monomer (etherified) is included in order that the copolymer which is formed will include such functionality. In this invention it is found that when the N-methylol functional monomer is present as a preformed ether with a $C_1 - C_8$ alcohol, that prereaction of the ether with the hydroxy-functional protective colloid is largely avoided and the resulting aqueous emulsion suffers very little increase in viscosity and retains substantially all of its adhesive quality. At the same time, and where water resistance is desired, the imposition of a moderate bake causes the alcohol to volatilize away and the N-methylol functionality which is thereby regenerated reacts rapidly to provide the desired water resistance.

It will be appreciated that the curing reaction may include reaction of N-methylol with itself, with the hydroxy groups in the protective colloid (which form part of the deposited film) and also with reactive groups, such as hydroxy groups, which may be present on the surfaces which are bonded together. In such instance, the initial adhesive bond can be substantially enhanced as opposed to the degradation in adhesion reported for the polyvinyl alcohol stabilized copolymer in said U.S. Pat. 3,708,388.

Referring more particularly to the hydroxyfunctional protective colloid, these have been illustrated hereinbefore and are employed in an amount of about 0.05 to 10%, preferably from 0.1 to 5%, based on the total weight of the latex.

The vinyl ester which is used is preferably vinyl acetate, but all of the vinyl esters with saturated aliphatic monocarboxylic acids are useful, vinyl propionate, vinyl stearate and vinyl versatate further illustrating the class under consideration. At least 40% of the copolymer, preferably at least 55% of the copolymer, will consist of vinyl ester, preferably vinyl acetate.

The vinyl ester may constitute the entire balance of the copolymer aside from the reactive monomer or monomers conferring curing capacity. Indeed, a copolymer containing in excess of 90% by weight of vinyl acetate with less than 10% by weight of N-methylol ether can be used. These copolymers provide excellent adhesives for wood, with the N-methylol ether providing the cure capacity needed to provide desired water resistance.

On the other hand, it is frequently desired to include in the copolymer from 5–40%, preferably from 20–40% of ethylene, based on the weight of the copolymer. Ethylene is of significance in the development of the desired adhesive characteristic in many instances, e.g., for the lamination of plastic films, such as polyvinyl chloride, to paper or wood. While the ethylene can be omitted or replaced, this invention has especial applicability to vinyl esterethylene copolymers. These are also of especial value for carpet backing, where water resistance is particularly desired.

If the ethylene component is to be replaced, an acrylate, maleate or fumarate ester containing from 2–18 carbon atoms in the ester group can be used, such as n-butyl acrylate, isobutyl acrylate or dibutyl maleate. These esters, if used, would be employed in an amount of 5–60%, preferably from 20–50%, based on the weight of the copolymer.

The monomers providing thermosetting or cure capacity may be used in an amount of from 0.5–15%, preferably 2–10%, based on the weight of the copolymer. At least 0.5, preferably at least 1%, based on the weight of the copolymer, will be constituted by the monoethylenic N-methylol ether, preferably from 1 to 8%. However, other monomers which can coreact with the N-methylol group may also be present to assist in the cure, such as monoethylenic amides or alcohols, either alone or together with a monoethylenic carboxylic acid.

The coreactive monomers are illustrated by acrylamide, methacrylamide, or other monoethylenic amide, or by allyl alcohol, 2-hydroxy ethyl acrylate or methacrylate, or the like. Monoethylenic carboxylic acids are illustrated by acrylic, methacrylic, crotonic or itaconic acids, or the like. Sulphonic acids, or their salts, such as 2-sulpho ethyl methacrylate or sodium vinyl sulphonate are also useful.

The selection of the N-methylol component which is used herein in ether form is subject to wide variation. Thus, N-methylol acrylamide or methacrylamide are useful herein, though these are not preferred. First, N-methylol acrylamide and N-methylol methacrylamide are highly reactive and etherification is frequently accompanied by homopolymerization or by the presence of excessive amounts of polymerization inhibitor which interferes with the subsequent vinyl acetate or ethylene polymerization. Second, and of great significance, is the fact that the polymerization is in aqueous emulsion. Particularly when ethylene is present, and even when it is not, the acrylamide derivative is partially in the water phase where it is more proximate to the polyvinyl alcohol or other protective colloid, and less proximate to the emulsified monomers where copolymerization is desired. This minimizes the insolubilization capacity of the N-methylol monomer.

Accordingly, preferred practice in this invention involves selecting, as the N-methylol monomer which is etherified for use herein, a formaldehyde adduct with an allyl carbamate. These allyl carbamates have the formula:

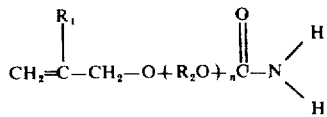

in which $R_1$ is hydrogen or methyl, $R_2$ is an alkylidene group containing from 2-4 carbon atoms, and $n$ is an integer from 0-10, preferably from 0-2.

Various allyl carbamates are useful herein, especially allyl carbamate. Allyl carbamate has the formula:

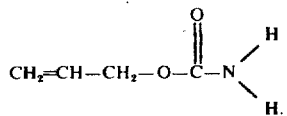

This monoethylenic monomer is not an amide and it will react with formaldehyde in an addition reaction with the two amino hydrogen atoms to generate the N-methylol group. When one molar proportion of formaldehyde is taken up, the derivative can be described by the formula:

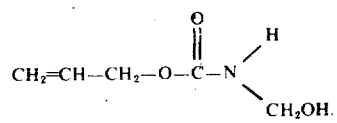

The same reaction can proceed to take up more formaldehyde to increase the hydroxy functionality which is generated.

Regardless of whether one or two moles of formaldehyde are reacted into the molecule, the monomer is an allyl ester and this is most important in the copolymerization with vinyl acetate, or other vinyl ester such as vinyl butyrate with ethylene, since the monomer reactivity ratio of the allylic unsaturation of the allyl ester with vinyl acetate is close to 1:1. In contrast, methylol acrylamide enters the vinyl ester-ethylene copolymer much more rapidly than the vinyl ester or the ethylene and is consumed long before the vinyl acetate and ethylene are polymerized, forcing a considerable portion of the polymer to lack the reactive group which is the basis for subsequent insolubilization.

The emulsion copolymerization is also improved herein by the increased hydrophobicity conferred by the allyl group creating a synergistic improvement in the capacity of the copolymer to become insolubilized on curing. Such hydrophobicity can also be conferred by the ether group, but this is not the case with the methyl and ethyl ethers which are the most volatile and preferred for that reason, making the allylic hydrophobicity more important.

As previously indicated, the allyl carbamate may include ether groups between the allyl group and the carbamate group. These ethers can be provided by reacting the allyl alcohol with an alkylene oxide, such as ethylene oxide, before converting the resulting alcohol to the carbamate as will be illustrated hereinafter.

The adduction of the carbamate with formaldehyde is well known and conventional and yields N-methylol derivatives. These are a mixture of the mono-N-methylol adduct, the di-N-methylol adduct and unreacted carbamate which, if present, is not harmful.

The N-methylol groups in this invention are etherified with a $C_1$–$C_8$ alcohol, preferably a $C_1$–$C_4$ alcohol. The alcohol is released on baking to regenerate the N-methylol group for cure, as is well known. Preferred alcohols are methyl alcohol and ethyl alcohol. Isopropyl alcohol and isobutyl alcohol are also highly effective. 2-ethoxy ethanol and 2-butoxy ethanol are also useful.

The invention is illustrated in the following examples in which all parts are by weight unless otherwise indicated. Some of the examples illustrate the invention by way of contrast.

EXAMPLE 1

The following was charged to a 1 - gallon stainless steel polymerization reactor equipped with temperature controls and an agitator

| Charge Composition (Parts) | | |
|---|---|---|
| 1100 | grams | Water |
| 53.3 | grams | Polyvinyl Alcohol (88% hydrolyzed polyvinyl acetate [4% solution viscosity 5 cps.]) |
| 74 | grams | Seed Latex (Previously prepared - see Note 1) |
| 5 | grams | Sodium Formaldehyde Sulfoxylate |
| 0.4 | gram | Sodium Benzoate |
| 0.02 | gram | Ferrous Sulfate |
| 900 | grams | Vinyl Acetate |
| 500 | grams | Dibutyl Maleate |

Water and polyvinyl alcohol were first charged to the reactor and agitated at 50°C. until completely dissolved before the remaining ingredients were charged.

The pH of the monomer emulsion was adjusted to 4.8 with 2 cc. of 18% HCl, and the temperature raised to 60°C. at which point a catalyst solution prepared as shown below is introduced drop wise over 2 hours to maintain the reaction.

Catalyst Solution
    66 grams Water
    5 grams Sodium Benzoate
    29 grams Hydrogen Peroxide (35% $H_2O_2$ in water)

A total of 50 cc. of the above catalyst solution was used to complete the reaction.

Periodic additions of a 15% solution of sodium formaldehyde sulfoxylate were made to maintain a reducing environment until a total of 20 cc's had been added.

The reaction was carried out a minimum reflux temperature, (69°–74°C.). The reaction was completed with the addition of 2 cc's of tertiary butyl hydroperoxide when the unreacted monomer was reduced to about 2%, and this lowers the unreacted monomer content to about 0.5%.

Note 1

The seed latex is a commercially produced polyvinyl acetate latex with particle size of .15 micron (any latex having the same particle size may be substituted).

The final latex product had the following properties:

| | |
|---|---|
| Viscosity (Brookfield, spindle No. 2, 20 rpm) | 1180 cps. |
| Solids (percent) | 54.8 |
| Intrinsic viscosity (dimethyl formamide at 30°C.) | 1.47 |
| Average particle size (microns) | 0.35 |
| Insolubles in Trichloroethylene (percent) | 4.3 |
| Mechanical stability (Hamilton Beech) | Stable 20+ minutes |
| pH | 5.7 |
| Surface Tension (dynes/cm) | 49 |

Note 2

3.4 grams of Hercules 831, a known defoamer may be added, if desired, to help control foaming.

The 4.3% insolubility is measured after a bake of 5 minutes at 280°F. and reflects the fact that there is no curing mechanism available, so the bulk of the film simply dissolved.

EXAMPLE 2

The procedure and recipe set forth in Example 1 were repeated except that 28 grams of N-methoxy methyl acrylamide were added to the monomer emulsion prior to polymerization, and then the reaction was carried out as before.

The latex product had the following properties:

| | |
|---|---|
| Viscosity (Brookfield, spindle No. 4, 20 rpm) | 3100 cps. |
| Solids (percent) | 54.3 |
| Intrinsic viscosity (dimethyl formamide, 30°C.) | 0.70 |
| Average particle size (microns) | 0.77 |
| Insolubles in Trichloroethylene (percent) | 20.2 |
| Swell Index | 11.3 |
| Mechanical Stability (Hamilton Beech) | Stable 20+ minutes |
| pH | 4.9 |
| Surface Tension (dynes/cm) | 49 |

As can be seen, the viscosity is about three fold higher and the insolubility after the standard bake is only 20.2%, indicating that almost 80% of the film dissolved.

EXAMPLE 3

The procedure and recipe set forth in Example 1 were repeated except that 28 grams of N-isobutoxy methyl acrylamide were uniformly and continuously added over 2 hours.

The product had the following properties:

| | |
|---|---|
| Viscosity (Brookfield, spindle No. 2, 20 rpm) | 1500 cps. |
| Solids (percent) | 55.8 |
| Intrinsic Viscosity (dimethyl formamide, 30°c.) | 0.74 |
| Average particle size (microns) | 0.39 |
| Insolubles in Trichloroethylene (percent) | 33.1 |
| Swell Index | 9.8 |
| Mechanical stability (Hamilton Beech) | Stable 20+ minutes |
| pH | 6.2 |
| Surface Tension (dynes/cm) | 51.8 |

As can be seen, the viscosity is far lower than in Example 2, and almost as low as in the thermoplastic Example 1, and the insolubility was distinctly raised from 20.2% to 33.1%.

EXAMPLE 4

The procedure and recipe set forth in Example 1 were repeated except that 28 grams of N-methoxymethyl allyl carbamate were added to the monomer emulsion, and then the reaction carried out as in Example 1.

The product had the following properties:

| | |
|---|---|
| Viscosity (Brookfield, spindle No. 2, 20 rpm) | 700 cps. |
| Solids (percent) | 54.2 |
| Intrinsic viscosity (dimethyl formamide, 30°C.) | 0.936 |
| Average particle size (microns) | 0.48 |
| Insolubles in trichloroethylene (percent) | 66.1 |
| Swell Index | 6.9 |
| Mechanical stability (Hamilton Beech) | Stable 20+ minutes |
| pH | 5.2 |
| Surface Tension (dynes/cm) | 47 |

As is apparent, the viscosity is excellent, but the insolubility was far higher, 66.1% as compared to 20.2% in Example 2.

EXAMPLE 5

The procedure and recipe set forth in Example 1 were repeated except that 42 grams of N-methoxymethyl allyl carbamate were added to the monomer emulsion and then the reaction carried out as in Example 1. The total solids were reduced to 45% at the end of the reaction.

The product had the following properties:

| | |
|---|---|
| Viscosity (Brookfield spindle No. 2, 20 rpm) | 520 cps. |
| Solids (percent) | 45.0 |
| Intrinsic viscosity (dimethyl formamide, 30°C.) | 1.32 |

-continued

| | |
|---|---|
| Average particle size (microns) | 0.7 |
| Insolubles in trichloroethylene (percent) | 76.6 |
| Swell Index | 6.68 |
| Mechanical stability (Hamilton Beech) | Stable 20+ minutes |
| pH | 5.1 |
| Surface Tension (dynes/cm) | 56 |

This example shows how a larger proportion of reactive monomer can be used herein to raise the insolubility to 76.6%. Viscosity was lowered to improve handling, though 45% solids is an acceptable solids content.

EXAMPLE 6

Example 1 was repeated, but with a somewhat larger proportion of polyvinyl alcohol (56.0 grams instead of the 53.3 used in Example 1). This new control was then used as a basis for a series of further comparisons. The data in Examples 1-5 is tabulated below, together with the additional data from the present series of examples and with further results presented on Example 8 as a control, Example 8 being a repeat of this example.

By far the best results are obtained when the insolubilization of the N-methylol allyl carbamate is combined with the protection and further water insolubilization obtained through etherification. Moreover, the vast improvement achieved using allyl carbamate cannot be fully explained on the basis of water insolubilization, and it seems clear that the effectiveness of copolymerization as well as the uniformity of copolymerization are also important characteristics leading to the improved results reported.

While detailed comparisons have been made in the vinyl acetate-ethylene copolymer system, essentially the same results are obtainable with any vinyl acetate polymer as illustrated by the following data obtained for a vinyl acetate homopolymer.

| Example | Solids | Viscosity | % Insolubility in Trichloroethylene | Cross-Linking Monomer | Percent |
|---|---|---|---|---|---|
| 12 | 55.7% | 1400 | 51 | — | — |
| 13 | 54% | 1040 | 95.5 | N-ethoxymethyl allyl carbamate | 1 |
| 14 | 54.2% | 550 | 97.1 | N-ethoxymethyl allyl carbamate | 2 |

Some insolubilization occurs without baking, especially on exposure to sunlight. Thus, the adhesive emulsions disclosed herein can be pigmented to form paints which insolubilize on exposure, especially in the sun, for use both indoors and outdoors.

All of the previous results were obtained by baking 5 minutes at 280°F. which represents typical baking conditions. On the other hand, particularly where the

| Example | Solids | Viscosity | % Insolubility in Trichloroethylene | Cross-Linking Monomer | Percent |
|---|---|---|---|---|---|
| 1 | 54.8% | 1180 | 4.3 | — | — |
| 2 | 54.3% | 3100 | 20.2 | N-methoxymethyl acrylamide | 2 |
| 3 | 55.8% | 1500 | 33.1 | N-isobutoxymethyl acrylamide | 2 |
| 4 | 54.2% | 700 | 66.1 | N-methoxymethyl allyl carbamate | 2 |
| 5 | 45% | 520 | 76.6 | N-methoxymethyl allyl carbamate | 3 |
| 6 | 46.3% | 6000 | 25.0 | N-methoxymethyl acrylamide | 4 |
| 7* | 45% | 950 | 87.7 | N-ethoxymethyl allyl carbamate | 2 |
| 8 | 52% | 625 | 13.57 | — | — |
| 9** | 48.5% | 920 | 16.44 | N-methylol acrylamide | 2 |
| 10** | 52% | 400 | 75.2 | N-ethoxymethyl allyl carbamate | 2 |
| 11** | 53.2% | 530 | 54.6 | N-ethoxymethyl allyl carbamate | 1 |

*made using Example 6 as control
**made using Example 8 as control

As can be seen from the above tabulation, N-methylol acrylamide was detrimental. It would appear that much of the N-methylol acrylamide reacted with the hydroxy functional colloid (the polyvinyl alcohol) which is dispersed in the aqueous continuum. Thus, viscosity was greatly increased, but the insolubility remained poor. Capping the N-methylol acrylamide with methyl alcohol was somewhat helpful since some limited insolubilization took place, but a very extensive reaction occurred with the hydroxy functional colloid resulting in extensive thickening. On the one hand, and in comparison with the use of N-methylol acrylamide, N-methoxymethyl acrylamide showed a considerable improvement. On the other hand, and in comparison with the other results achieved in accordance with the invention, N-methoxymethyl acrylamide is quite inferior. Moreover, the carbamate derivatives were distinctly superior as can be seen by comparing Examples 2 and 3 with Example 4.

methyl and ethyl ethers are employed, these volatilize at room temperature, and insolubility develops with time.

The results obtained in this invention using ethylene in the copolymer are illustrated in the following examples.

EXAMPLE 15

A stainless steel pressure reactor equipped with agitator, temperature controls, feed pumps, and gas inlet tube was charged with the following ingredients:

| Main Charge | | Parts |
|---|---|---|
| Water | 3200 | grams |
| Polyvinyl Alcohol* | 205 | grams |
| Polyvinyl Alcohol** | 619.5 | grams |
| Hydrochloric Acid | 5.24 | grams |
| Ferrous Sulfate | 0.32 | grams |
| Water | 1670 | grams |

*(88% hydrolyzed polyvinyl acetate [4% solution viscosity = 22 cps.])
**(88% hydrolyzed polyvinyl acetate [4% solution viscosity = 5 cps.])

The polyvinyl alcohols were first completely dissolved in 13,200 grams of water before charging to the reactor. On completion of addition of these ingredients, the reactor was thoroughly purged of residual oxygen by repeated flushing with nitrogen, then ethylene with pressure reduced between purging with a water aspirator. Following the purging 17,250 grams of vinyl acetate were added to the reactor and reactor pressured to 650 pounds with ethylene.

An activator solution prepared as shown was added initially.

| | |
|---|---|
| Water | 118 grams |
| Sodium Formaldehyde Sulfoxylate | 19 grams |

An additional 66 grams of sodium formaldehyde sulfoxylate was added as an 8% solution during the course of reaction in order to maintain the reaction on the reducing side.

The reaction was catalyzed by continuous addition of an oxidizing solution made up as shown:

| | |
|---|---|
| Hydrogen Peroxide (35% active) | 14.3 grams |
| Water | 1170 grams |

The reaction was run at 50°C. and ethylene pressure maintained between 650 and 700 pounds per square inch until the free monomer was below 0.6% at which point the excess ethylene was vented and pH adjusted to 4.5 with 25 cc. ammonium hydroxide.

The product had the following properties:

| | |
|---|---|
| Percent Solids | 52.0 |
| pH | 4.5 |
| Free Monomer | 0.4% |
| Mechanical Stability (Hamilton Beech) | Stable 20+ minutes |
| Viscosity (Brookfield, spindle 2, 20 rpm) | 880 cps. |
| Intrinsic Viscosity (dimethyl formamide at 30°C.) | 1.91 |
| Particle size, microns | 0.52 |
| % Insolubles in Trichloroethylene | 16.9% |
| Glass Transition Temperature | −13°C. (about 20% ethylene) |
| Swell Index | 14.5% |

This copolymer lacks any cure mechanism, and the bulk of the copolymer simply dissolved.

EXAMPLE 16

The procedure and recipe cited in Example 15 were repeated except that 345 grams of N-ethoxymethyl allyl carbamate were added to the initial reactor charge, and then the reaction carried out as in Example 6. At completion of reaction, the solids were reduced to 46.7% by adding 1800 grams water.

The product had the following properties:

| | |
|---|---|
| Total Solids (percent) | 46.7 |
| pH | 4.7 |
| Mechanical Stability (Hamilton Beech) | 20+ minutes |
| Free Monomer | 0.5% |
| Viscosity (Brookfield, spindle No. 6, 20 rpm) | 2350 cps. |
| Intrinsic Viscosity (dimethyl formamide at 30°C.) | 1.24 |
| % Insolubles in Trichloroethylene | 80.2% |
| Glass Transition Temperature | −9°C. (about 15% ethylene) |
| Swell Index | 10.3% |

As can be seen, the insolubility was vastly increased from 16.9 to 80.2%, even though less ethylene was incorporated in this run.

The invention is defined in the claims which follow in which all proportions are by weight.

I claim:

1. An aqueous adhesive emulsion which develops water resistance through cure, the water of said emulsion having emulsified therein an aqueous emulsion copolymer of monoethylenic monomers, at least 40 up to 99.5% of the copolymer being vinyl ester of a saturated aliphatic monocarboxylic acid having up to 18 carbon atoms and from 0.5 – 15% of the copolymer of monomers providing thermosetting characteristics and consisting essentially of $C_1-C_8$ alcohol ether of an N-methylol derivative of an allyl carbamate having the formula:

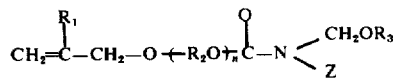

in which $R_1$ is hydrogen or methyl, $R_2$ is an alkylidene group containing from 2–4 carbon atoms, $R_3$ is the residue of the $C_1-C_8$ etherifying alcohol, Z is hydrogen or another $-CH_2OR_3$ group, and n is an integer from 0–10, any balance of said copolymer consisting essentially of nonreactive monoethylenic monomers copolymerizable with said vinyl ester, the monomers of said copolymer being emulsified during copolymerization by from 0.5 to 10% of an hydroxy functional protective colloid.

2. An aqueous adhesive emulsion as recited in claim 1 in which said copolymer includes from 5–40% of ethylene.

3. An aqueous adhesive emulsion as recited in claim 1 in which said copolymer includes from 20–40% of ethylene.

4. An aqueous adhesive emulsion as recited in claim 1 in which from 5–60% of monoethylenic maleate or fumarate alcohol diester containing from 2–18 carbon atoms is included in the copolymer.

5. An aqueous adhesive emulsion as recited in claim 1 in which said monomers providing thermosetting characteristics are present in an amount of from 2–10%

6. An aqueous adhesive emulsion as recited in claim 1 in which said hydroxy-functional protective colloid is selected from the group consisting of polyvinyl alcohol and hydroxy ethyl cellulose.

7. An aqueous adhesive emulsion as recited in claim 6 in which said hydroxy functional protective colloid is polyvinyl alcohol.

8. An aqueous adhesive emulsion as recited in claim 1 in which said copolymer includes at least 55% of vinyl acetate.

9. An aqueous adhesive emulsion as recited in claim 1 in which said N-methylol functional derivative has the formula:

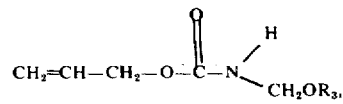

where $R_3$ is the residue of a $C_1 - C_8$ alcohol.

10. An aqueous adhesive emulsion which develops water resistance through cure, the water of said emulsion having emulsified therein an aqueous emulsion copolymer consisting essentially of monoethylenic monomers, at least 55% up to 94.5% of the copolymer being vinyl acetate, from 5–40% of the copolymer being ethylene, and from 0.5–15% of the copolymer of monomers providing thermosetting characteristics, and consisting essentially of $C_1 - C_8$ alcohol ether of an N-methylol derivative of an allyl carbamate having the formula:

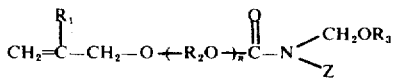

in which $R_1$ is hydrogen or methyl, $R_2$ is an alkylidene group containing from 2–4 carbon atoms, $R_3$ is the residue of the $C_1 - C_8$ etherifying alcohol, Z is hydrogen or another $-CH_2OR_3$ group, and n is an integer from 0–10, the monomers of said copolymer being emulsified during copolymerization by from 0.05 to 10% of an hydroxy functional protective colloid.

11. An aqueous adhesive emulsion as recited in claim 1 in which said copolymer consists essentially of vinyl acetate, ethylene, and $C_1 - C_4$ alcohol ether of mono-N-methylol allyl carbamate, and said protective colloid is polyvinyl alcohol.

12. An aqueous adhesive emulsion copolymer as recited in claim 10 in which said N-methylol monoethylenic monomer is a methyl or ethyl ether of mono-N-methylol allyl carbamate, and is present in an amount of from 1 to 8%.

13. An aqueous adhesive emulsion which develops water resistance through cure, the water of said emulsion having emulsified therein an aqueous emulsion copolymer consisting essentially of at least 55% up to 94.5% of the copolymer of vinyl acetate, from 5–60% of maleate or fumarate diester containing 2–18 carbon atoms in the ester group, and from 0.5–15% of the copolymer of monomers providing thermosetting characteristics and consisting essentially of $C_1 - C_8$ alcohol ether of an N-methylol derivative of an allyl carbamate having the formula:

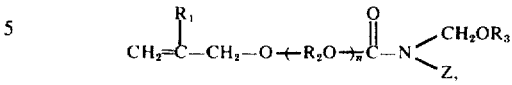

in which $R_1$ is hydrogen or methyl, $R_2$ is an alkylidene group containing from 2–4 carbon atoms, $R_3$ is the residue of the $C_1 - C_8$ etherifying alcohol, Z is hydrogen or another $-CH_2OR_3$ group, and n is an integer from 0–10, the monomers of said copolymer being emulsified during copolymerization by from 0.05 to 10% of an hydroxy functional protective colloid.

14. An aqueous adhesive emulsion as recited in claim 13 in which said copolymer consists essentially of vinyl acetate, said maleate or fumarate diester, and $C_1 - C_4$ alcohol ether of mono-N-methylol allyl carbamate, and said protective colloid is polyvinyl alcohol.

15. An aqueous adhesive emulsion which develops water resistance through cure, the water of said emulsion having emulsified therein an aqueous emulsion copolymer consisting essentially of at least 90% up to 99.5% of the copolymer of vinyl acetate, and from 0.5–10% of the copolymer of monomers providing thermosetting characteristics and consisting essentially of $C_1 - C_8$ alcohol ether of an N-methylol derivative of an allyl carbamate having the formula:

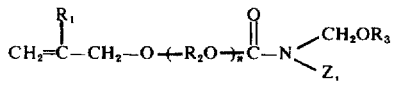

in which $R_1$ is hydrogen or methyl, $R_2$ is an alkylidene group containing from 2–4 carbon atoms, $R_3$ is the residue of the $C_1 - C_8$ etherifying alcohol, Z is hydrogen or another $-CH_2OR_3$ group, and n is an integer from 0–10, the monomers of said copolymer being emulsified during copolymerization by from 0.05 to 10% of an hydroxy functional protective colloid.

16. An aqueous adhesive emulsion as recited in claim 15 in which said copolymer consists essentially of vinyl acetate and $C_1 - C_4$ alcohol ether of mono-N-methylol allyl carbamate, and said protective colloid is polyvinyl alcohol.

* * * * *

UNITED STATES PATENT OFFICE
CERTIFICATE OF CORRECTION

PATENT NO. : 3,941,735
DATED : March 2, 1976
INVENTOR(S) : Martin K. Lindemann

It is certified that error appears in the above-identified patent and that said Letters Patent are hereby corrected as shown below:

Col. 1, after the Assignee, insert --Notice: The portion of the term of this patent subsequent to Dec. 3, 1991, has been disclaimed.--

Col. 1, line 66; col. 4, line 44; col. 11, line 1; col. 11, last line; col. 12, line 11; and col. 12, line 28, "$c_8$" should read --$C_8$--

Col. 4, line 44; and col. 12, line 44, "$c_4$" should read --$C_4$--

Col. 2, line 18, "hydroxyfunctional" should read -- hydroxy-functional --

Col. 2, line 48, "esterethylene" should read -- ester-ethylene --

Col. 5, line 21, "a" should read --at--

Col. 10, formula in claim 1, line 25, $\overset{O}{\underset{|}{C}}$ should read $\overset{O}{\underset{\|}{C}}$ Col. 11, claim 11, line 2, "1" should read --10--

Col. 12, claim 15, next to last line, before "by" insert --polymer being emulsified during copolymerization--

Signed and Sealed this

Third Day of August 1976

[SEAL]

Attest:

RUTH C. MASON
*Attesting Officer*

C. MARSHALL DANN
*Commissioner of Patents and Trademarks*